United States Patent
Miyagawa et al.

(10) Patent No.: US 6,497,047 B1
(45) Date of Patent: Dec. 24, 2002

(54) FLATNESS MEASURING EQUIPMENT

(75) Inventors: Chihiro Miyagawa, Nagano (JP); Yoshio Nakamura, Nagano (JP)

(73) Assignee: Fujikoshi Kikai Kogyo Kabushiki Kaisha, Nagano (JP)

( * ) Notice: Subject to any disclaimer, the term of this patent is extended or adjusted under 35 U.S.C. 154(b) by 0 days.

(21) Appl. No.: 09/517,836

(22) Filed: Mar. 2, 2000

(30) Foreign Application Priority Data

Mar. 10, 1999 (JP) .......................................... 11-063462

(51) Int. Cl.[7] .............................. G01B 5/25; G01B 11/27
(52) U.S. Cl. ....................... 33/533; 33/1 BB; 33/227
(58) Field of Search ............................. 33/1 BB, 1 CC, 33/227, 228, 284, 286, 700, 701, 706, 832, 521, 533; 356/498, 508, 511, 516, 371, 400

(56) References Cited

U.S. PATENT DOCUMENTS

| | | | | |
|---|---|---|---|---|
| 2,963,900 A | * | 12/1960 | Kuebler | .................... 33/1 BB |
| 4,320,577 A | * | 3/1982 | Lauritzen | ..................... 33/613 |
| 4,693,012 A | | 9/1987 | Cesna | |
| 4,718,173 A | * | 1/1988 | Eklund | ........................ 33/533 |
| 5,018,853 A | * | 5/1991 | Hechel et al. | ................. 33/288 |
| 5,269,070 A | * | 12/1993 | Thurston | ...................... 33/533 |
| 6,005,669 A | * | 12/1999 | Pahk et al. | .................. 356/511 |
| 6,067,165 A | * | 5/2000 | Matsumiya et al. | ........... 33/371 |
| 6,148,532 A | * | 11/2000 | Ellis | ............................ 33/533 |
| 6,169,290 B1 | * | 1/2001 | Rosberg et al. | ................ 33/533 |

FOREIGN PATENT DOCUMENTS

| | | |
|---|---|---|
| JP | 63204109 | 8/1988 |
| JP | 63204110 | 8/1988 |
| JP | 2545166 | 2/1993 |
| JP | 854204 | 2/1996 |

* cited by examiner

*Primary Examiner*—Christopher W. Fulton
(74) *Attorney, Agent, or Firm*—Jordan and Hamburg LLP

(57) ABSTRACT

The flatness measuring equipment can highly precisely measure flatness of a surface of a large-sized planar member, e.g., an abrasive plate. In the equipment, an elongated member is provided above and parallel to the surface of the planar member to be measured. A movable member is provided to the elongated member and capable of moving along the elongated member. A distance sensor, which is provided to the movable member, measures distance between the movable member and the surface of the planar member. A laser beam source emits a laser beam, at a fixed level, toward the movable member. A light receiving sensor detects a variation of a level of the movable member with respect of the fixed level of the laser beam.

19 Claims, 2 Drawing Sheets

FLATNESS MEASURING EQUIPMENT

BACKGROUND OF THE INVENTION

The present invention relates to a flatness measuring equipment, more precisely relates to a flatness measuring equipment capable of highly precisely measuring flatness of a surface of a large-sized planar member, e.g., an abrasive plate of an abrasive machine, which abrades silicon wafers.

In an abrasive machine, a planar member to be abraded, e.g., a silicon wafer, is mounted on an abrasive plate, whose surface must be a highly flat face. Since the flatness of the surface of the abrasive plate directly influences abrading accuracy of the silicon wafer, the surface of the abrasive plate must have high flatness. When the abrasive plate is manufactured, the flatness of the surface is precisely measured to have predetermined flatness.

A conventional method of measuring flatness of an abrasive plate is shown in FIG. 4. A plurality of dial gauges 12 are provided to a bar member 10 with predetermined separations. Steel balls 13 are respectively fixed, on a bottom face of the bar member 10, at both ends of the bar member 10. With this structure, the bar member 10 is supported by the steel balls 13. Projected length (nearly equal to diameter) of the steel balls 13 are designed to be equal to a standard projected length of sensing needles of the dial gauges 12.

The flatness of the surface of the abrasive plate 14 is measured by the steps of: mounting the measuring equipment on a flat standard base, which is made of a ceramic, etc.; resetting the dial gauges 12 zero; mounting the measuring equipment on the abrasive plate 14 to be measured; and measuring the flatness of the abrasive plate 14 by reading measured values of the dial gauges 12. Note that, the flatness can be measured by a laser displacement sensor, a contact displacement sensor, etc. instead of the dial gauges 12.

In the conventional methods, the rigid bar member 10 is spanned over the planar member to be measured, and the bar member 10 is used as a standard level means for measuring the flatness of the planar member. However, the flat standard base for adjusting the dial gauges, etc. usually has about 1 $\mu$m of error in level, and the bar member 10 for setting the standard level and the dial gauges, etc. also have errors about 1 $\mu$m. Thus, errors about 1–2 $\mu$m cannot be avoided in the conventional flatness measuring equipments.

These days, in the field of manufacturing semiconductor devices, a required accuracy of abrading silicon wafers is 0.2 $\mu$m. In this case, flatness of silicon wafers cannot be measured by the conventional flatness measuring equipments.

Further, large-sized abrasive machines, which include, for example, 5 m-abrasive plates, are used now. Thus, large-sized flatness measuring equipments are required. In the large-sized flatness measuring equipment, length of the bar member must be longer and longer, so deformation of the bar member, which is caused by its own weight, cannot be ignored. Further, a large-sized flat standard base, which must be highly precisely manufactured, is required. Namely, it is impossible to highly precisely measure flatness of the large-sized planar member by the conventional flatness measuring equipments.

SUMMARY OF THE INVENTION

An object of the present invention is to provide a flatness measuring equipment, which is capable of highly precisely measuring flatness of a surface of a large-sized planar member.

Namely, the flatness measuring equipment of the present invention comprises:

an elongated member being provided above and parallel to a surface of a planar member to be measured;

a movable member being provided to the elongated member and capable of moving along the elongated member;

means for measuring distance between the movable member and the surface of the planar member, the measuring means being provided to the movable member so as to measure the distance at positions where the movable member is located;

means for emitting a laser beam, at a fixed level, toward the movable member on the elongated member; and means for detecting a variation of a level of the movable member with respect of the fixed level of the laser beam.

With this structure, the true distance between the standard level and the surface of the planar member can be known by detecting the variation of the level of the movable member, which is moved along the elongated member. Even if the elongated member is long and deformed by its own weight, said true distance can be known, so that highly rigidity is not required to the elongated member and it can be manufactured easily.

In the equipment, the detecting means may be a light receiving sensor. And, the light receiving sensor may be a plurality of photo sensitive cells or a CCD camera.

In the equipment, the measuring means may be a non-contact distance sensor.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
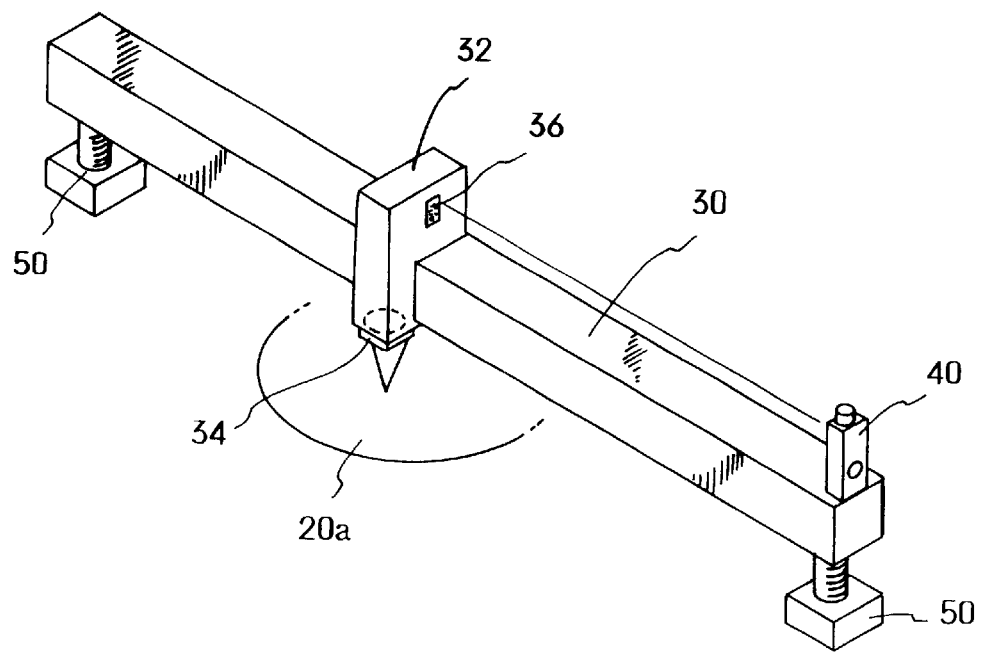
FIG. 1 is a perspective view of a flatness measuring equipment of an embodiment of the present invention.

FIG. 1 is a perspective view of a flatness measuring equipment of the present embodiment. In the drawing, a bar member 30 is a long square pillar; a movable member 32 is movably attached to the bar member 30 and capable of moving in the longitudinal direction thereof; a laser beam source 40 is fixed to one end of the bar member 30; and adjusters 50, which are capable of adjusting height of the bar member 30, are respectively attached to both ends of the bar member 30.

The bar member 30 is located to bridge over a planar member 20a to be measured, e.g., an abrasive plate, so length of the bar member 30 is determined on the basis of the size of the planar member. Preferably, the bar member 30 is made of a rigid material, e.g., a ceramic, a metal, so as to prevent deformation. The bar member 30 guides a linear movement of the movable member 32, so its shape is not limited to the long square pillar. A circular rod, a circular pipe, etc. may be employed as the bar member 30. Further, a guide rail for guiding the movement of the movable member 32 may be provided.

Means for measuring distance between the movable member 32 and a surface of the planar member is provided to movable member 32. The measuring means measures said distance at any positions, along the bar member 30, where the movable member 32 is located.

In the present embodiment, a non-contact distance sensor 34 is provided to a bottom face of the movable member 32 as the measuring means. The non-contact distance sensor 34 is a known optical sensor, which is capable of optically measuring the distance between the movable member 32 and the surface of the planar member to be measured. Measuring error of the optical sensor can be limited within 0.5 $\mu$m.

With this structure, the movable member 32 can measure the distance to the surface of the planar member at any positions within the bar member 30. Note that, the measuring means must have predetermined measuring accuracy, but it is not limited to the optical distance sensor. A contact-type sensor having the predetermined measuring accuracy may be employed. But, in the case of rotating the planar member so as to measure the whole surface, the non-contact sensor is recommended.

The movable member 32 can be moved and located at any positions on the bar member 30. And it may be manually moved or self-moved by a servo motor, etc. Signal lines for outputting data signals from the distance sensor 34 are connected to the movable member 32, so electric cables for supplying electricity to the servo motor are also attached to the movable member 32, so that the movable member 32 can be remote-controlled.

The laser beam source 40, which is fixed to the one end of the bar member 30, emits a laser beam, in a fixed direction, toward the movable member 32. Level of height of the laser beam, which is emitted from the laser beam source 40, is fixed as a standard level. The laser beam is emitted so as to detect a variation of level or height of the movable member 32, which is moved on the bar member 30, with respect to the standard level, at any positions on the bar member 30.

Namely, the laser beam is emitted, in the direction parallel to the bar member 30, from the laser beam source 40 and reaches the movable member 32, which is moved on the bar member 30.

The laser beam is highly linearly emitted, and the direction and the level of the laser beam are fixed, so that the variation of the level of the movable member 32 on the bar member 30, with respect to the standard level, can be known by receiving the laser beam by a sensor attached to the movable member 32.

A light receiving sensor 36 is attached to the movable member 32 so as to receive the laser beam. The laser beam emits the sensor 36 as a small beam spot, so that the variation of the level of the movable member 32 can be know by detecting the position of the beam spot on the light receiving sensor 36.

The bar member 30 has enough rigidity so as not to be deformed by its own weight. But, in the case of a long bar member, e.g., 5 m, the deformation cannot be avoided, and it is impossible to limit the deformation within 1 $\mu$m. Even if the bar member 30 is precisely manufactured, the deformation more than 1 $\mu$m is occurred by weight of the bar member 30, and mechanical play between the movable member 32 and the bar member 30 cannot be avoided, so that the level of the movable member 32 varies with the movement thereof.

In the present embodiment, the level of the movable member 32 is varied with the movement of the movable member 32 along the bar member 30, and the variation of the level of the movable member 32 is measured by using the laser beam emitted from the laser beam source 40. Namely, the fixed level of the laser beam, which is emitted from the laser beam source 40, is defined as the standard level, and the variation of the level of the movable member 32 can be known by detecting amount of displacement of the movable member 32 with respect to the standard level. The variation values are interpolated to the measured values of the distance sensor 34, so that the flatness of the surface of the planar member can be known.

When the level of the movable member 32 is varied with the movement of the movable member 32 along the bar member 30, a receiving point of the laser beam spot in the light receiving sensor 36 is varied, so the variation of the level of the movable member 32 can be known by detecting variation of the receiving point therein.

The receiving point of the laser beam in the light receiving sensor 36 can be detected by a CCD camera, a plurality of photo sensitive cells vertically arranged, etc. The light receiving sensor 36 detects the relative vertical variation of the laser beam spot with respect to the light receiving sensor 36. If CCD elements or pixels of the CCD camera is larger than the laser beam spot, the laser beam spot is optically enlarged.

To measure the flatness of the planar member, the level of the surface of the planar member is measured at each measuring position, so the position of the movable member 32 on the bar member 30, which correspond to the measuring position, must be precisely detected. The position of the movable member 32 on the bar member 30 can be detected by a distance sensor provided to the bar member 30, a microcontroller for processing control data from a servo motor for moving the movable member 32. In the present embodiment, a distance between the laser beam source 40 and the movable member 32 is detected by reflection of the laser beam emitted from the laser beam source 40. For example, a half mirror for measuring the distance is provided to the light receiving sensor 36, so that the position of the movable member 32 on the bar member 30 can be detected.

By measuring the vertical level variation of the movable member 32 with the laser beam, the measuring accuracy of the vertical level variation of the movable member 32 can be about 0.1 $\mu$m. By interpolating the values of the vertical variation of the movable member 32, which is caused by the deformation of the bar member 30, the flatness can be precisely measured even if the bar member 30 is deformed.

In an actual operation, the laser beam is not always emitted. The laser beam may be emitted from the laser beam source 40 when the movable member 32 reaches the measuring position so as to measure the variation of the level of the movable member 32. Then the distance sensor 34 measures the distance between the movable member 32 and the planar member.

Figure 2:
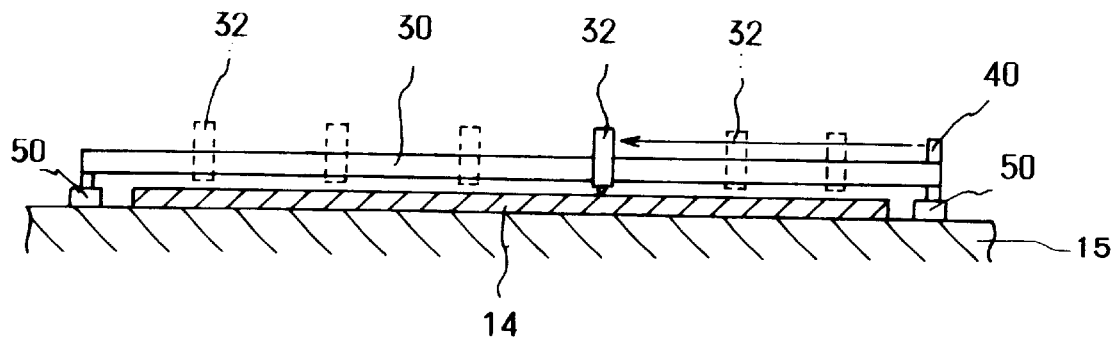
FIG. 2 is an explanation view explaining a method of measuring flatness of an abrasive plate by the flatness measuring equipment.

FIG. 2 is an explanation view explaining the method of measuring the flatness of an abrasive plate 14, which is an example of the planar member. The abrasive plate 14 may be set in an abrasive machine or set on a standard base for measuring flatness. In the case of setting in the abrasive machine, the adjusters 50 are correctly positioned on a frame 15 of the abrasive machine, and the bar member 30 is set to bridge over the abrasive plate 14. On the other hand, in the case of setting on the standard base, the adjusters 50 are correctly set on the standard base and the bar member 30 is set thereon. Note that, the adjusters 50 may be mounted on the abrasive plate 14. In the case that the distance between the bar member 30 and the planar member is not adjusted, fixed supporting means may be employed instead of the adjusters 50.

When the flatness is measured, firstly the movable member 32 is moved to the one end of the bar member 30, to which the laser beam source 40 is attached, so as to confirm if the laser beam is received by the light receiving sensor 36 or not, then the movable member 32 is moved to the other end of the bar member 30 so as to confirm if the laser beam is received, by the light receiving sensor 36, at an edge of the abrasive plate 14 or not. If the laser beam is not received or not correctly received by the light receiving sensor 36, the direction of emitting the laser beam, which is emitted from the laser beam source 40, is adjusted to be correctly received by the light receiving sensor 36. Note that, a position of the light receiving sensor 36 of the movable member 32 may be adjusted.

If the laser beam is correctly received by the light receiving sensor 36 of the movable member 32, the movable member 32 is moved to the measuring positions as shown in FIG. 2, then the distance to the surface of the abrasive plate 14 is measured by the distance sensor 34 at each measuring position. Simultaneously, the vertical displacement of the movable member 32, with respect to the standard level of the laser beam, is measured by receiving the laser beam from the laser beam source 40 by the light receiving sensor 36. The correct height of the surface of the abrasive plate 14 at the measuring position can be measured on the basis of the distance measured by the distance sensor 34 and the level variation of the movable member 32 measured by the light receiving sensor 36.

Figure 3:
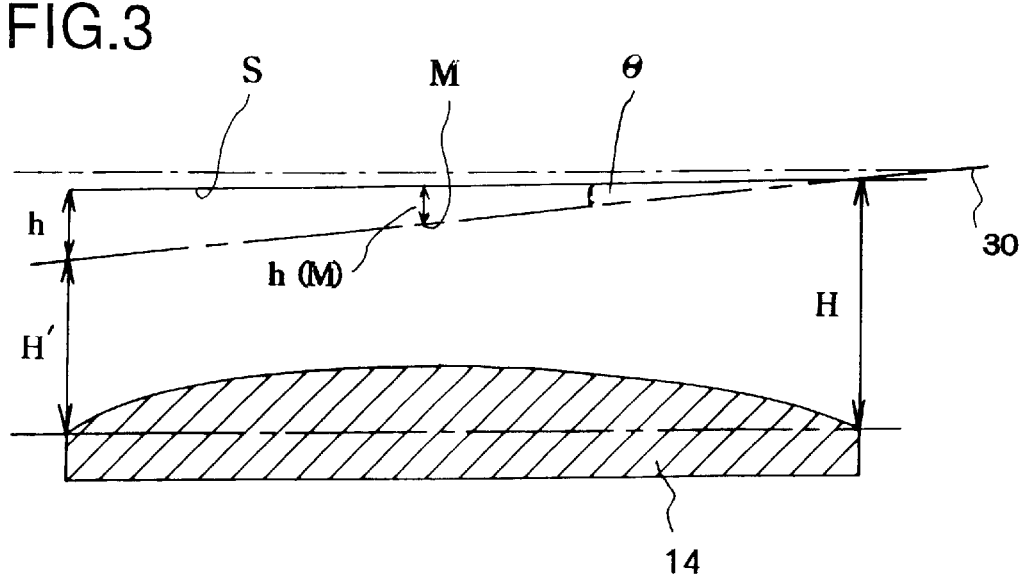
FIG. 3 is an explanation view explaining the method using a laser beam.
Figure 4:
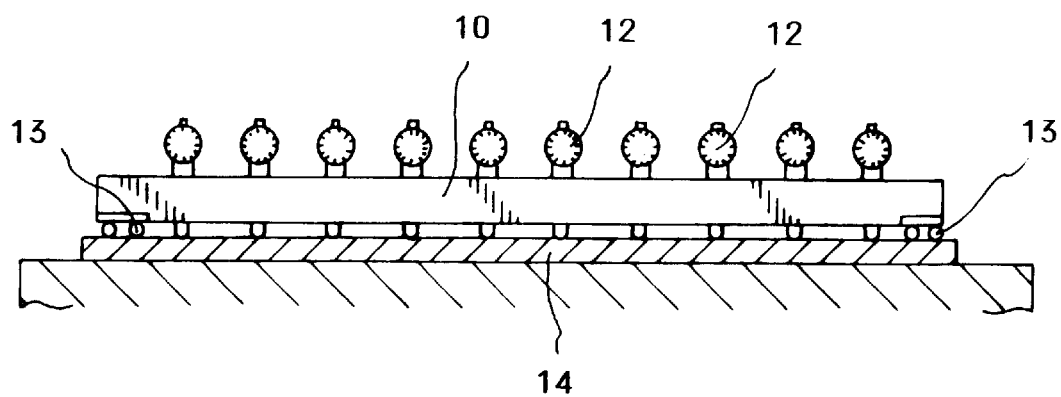
FIG. 4 is a front view of the conventional flatness measuring equipment.

Theory of measuring the flatness of the surface of the abrasive plate 14 will be explained with reference to FIG. 3. In the drawing, a symbol H stands for the distance between the one end of the bar member 30 and one end of the abrasive plate 14; a symbol H' stands for the distance between the other end of the bar member 30 and the other end of the abrasive plate 14. Inclination angle θ of the bar member 30, with respect to the standard level S of the laser beam, can be known by calculating value h (h=H−H'), so that the true level of the movable member 32 at the measuring position M on the bar member 30 can be known by interpolating the value h(M) of the position M to the actually measured level of the movable member 32 at the position M.

By interpolating the level of the movable member 32, the distance to the surface of the abrasive plate 14, which is measured by the distance sensor 34, is an absolute value, in which the vertical displacement of the movable member 32 has been considered.

By measuring the level of the movable member 32 and the distance to the surface of the abrasive plates 14 at the measuring positions on the bar member 30, conditions of the surface of the abrasive plate 14 can be precisely known. By moving the movable member 32 on the bar member 30 and measuring at many measuring positions, detail data of the surface conditions can be collected. Note that, the measurement can be executed with rotating the abrasive plate 14. In this case, the flatness of the whole surface can be measured.

In the flatness measuring equipment, the variations of the level of the movable member 30 can be corrected, so that the flatness of a large-sized planar member can be precisely measured even if the deformation of the long bar member 30 is unavoidable. In other words, the deformation of the bar member 30 can be corrected, so the bar member 30 can be easily manufactured without high rigidity and manufacturing accuracy.

The standard base for adjusting measuring means is not necessary for the flatness measuring equipment of the present embodiment, so large-sized planar members can be measured without preparing large-sized standard bases.

Since the laser beam has high linearity, the interpolation can be correctly executed by processing data even if the receiving point of the laser beam spot is slightly shifted from the predetermined point in the light receiving sensor 36. The distance between the movable member 32 and the surface of the planar member may be in a measuring range of the distance sensor 34, so the flatness measuring equipment can be set easier.

Note that, in the present embodiment, the laser beam source 40 is fixed to the one end of the bar member 30, but the laser beam source 40 may be separated from the bar member 30. Namely, the bar member 30, on which the movable member 32 is attached, provided to bridge over the planar member, and the laser beam source 40 is provided to a flat frame or a flat supporting member so as to emit the laser beam toward the movable member 32. In this case, firstly the height of the planar member is measured at one end of the bar member 30, next the height of the planar member is measured at the other end of the bar member 30 so as to correctly set the laser beam direction, then the movable member 32 is moved to the measuring positions on the bar member 30 to measure.

In the present embodiments, the flatness measuring equipment measures the flatness of the surface of the abrasive plate, but the present invention is not limited to the abrasive plate, it is capable of precisely measuring the flatness of many kinds of planar members. Especially, the flatness measuring equipment of the present invention is advantageous for large-sized planar members because the deformation of the bar member cannot be avoidable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A flatness measuring equipment, comprising;
   an elongated member being provided above and parallel to a surface of a planar member to be measured;
   a movable member being provided to said elongated member and capable of moving along said elongated member;
   means for measuring distance between said movable member and the surface of said planar member, said measuring means being provided to said movable member so as to measure said distance at positions where said movable member is located;
   means for emitting a laser beam, at a fixed level, toward said movable member on said elongated member;
   means for detecting a variation of a level of said movable member with respect of the fixed level of the laser beam; and means for detecting a longitudinal position of the movable member including detecting a longitudinal distance between the movable member and the means for emitting the laser beam by evaluating the laser beam.

2. The equipment according to claim 1, wherein said detecting means is a light receiving sensor.

3. The equipment according to claim 2, wherein said light receiving sensor includes a plurality of photo sensitive cells.

4. The equipment according to claim 2, wherein said light receiving sensor is a CCD camera.

5. The equipment according to claim 1, wherein said measuring means is a non-contact distance sensor.

6. A flatness measuring equipment for measuring flatness of a test surface, comprising:

an elongated member provided above and parallel to the test surface to be measured;

a movable member provided on said elongated member and capable of moving along said elongated member;

means for measuring distance between said movable member and the test sure, said measuring means fixed to said movable member so as to measure said distance at positions where said movable member is located;

means for emitting a laser beam, at a fixed level, toward said movable member on said elongated member, means for detecting a variation of a level of said movable member with respect to the fixed level of the laser beam and compensating the distance measured to determine flatness of the test surface using the detected variation of the level of the movable member; and means for detecting a longitudinal position of the movable member including detecting a longitudinal distance between the movable member and the means for emitting the laser beam by evaluating the laser beam.

7. The equipment according to claim 6, wherein said detecting means is a light receiving sensor.

8. The equipment according to claim 7, wherein said light receiving sensor includes a plurality of photo sensitive cells.

9. The equipment according to claim 7, wherein said light receiving sensor is a CCD camera.

10. The equipment according to claim 6, wherein said measuring means is a non-contact distance sensor.

11. The equipment according to claim 6, wherein the elongated member is situated over a receiving area for a planar test surface.

12. The equipment according to claim 11, wherein said measuring means for is a non-contact distance sensor.

13. The equipment according to claim 12, wherein the elongated member is situated over a receiving area for a planar test surface.

14. A flatness measuring equipment for measuring flatness of a test surface, comprising:

an elongated member provided above and parallel to the test surface to be measured;

a movable member provided on said elongated member and capable of moving along said elongated member;

means for measuring distance between said movable member and the test surface, said measuring means fixed to said movable member so as to measure said distance at positions where said movable member is located;

means for emitting a laser beam, at a fixed level, toward said movable member on said elongated member, means for detecting a longitudinal position of the movable member from the means for emitting the laser beam, including detecting a longitudinal distance between the movable member and the means for emitting the laser beam by evaluating the laser beam; and means for detecting a variation of a level of said movable member with respect of the fixed level of the laser beam at positions where said movable member is located and compensating the distance measured to determine flatness of the test surface using the detected variation of the level of the movable member and correlating the flatness of the test surface to the detected longitudinal position.

15. The equipment according to claim 14, wherein said means for detecting a variation level is a light receiving sensor.

16. The equipment according to claim 14, wherein said light receiving sensor includes a plurality of photo sensitive cells.

17. The equipment according to claim 14, wherein said light receiving sensor is a CCD camera.

18. The equipment according to claim 14, wherein the means for detecting the longitudinal position includes the laser beam at the fixed level using reflected light.

19. the equipment according to claim 14, wherein the means for detecting longitudinal position includes a detection device on the elongated member.

* * * * *